United States Patent
Nakano

(10) Patent No.: US 11,351,694 B2
(45) Date of Patent: Jun. 7, 2022

(54) BRUSHING MACHINE FOR PRODUCING VINTAGE-STYLE LUMBER, VINTAGE-STYLE LUMBER, AND METHOD FOR PRODUCING VINTAGE-STYLE LUMBER

(71) Applicant: NAKANO LUMBER INC., Kameyama (JP)

(72) Inventor: Yoshitaka Nakano, Kameyama (JP)

( * ) Notice: Subject to any disclaimer, the term of this patent is extended or adjusted under 35 U.S.C. 154(b) by 0 days.

(21) Appl. No.: 16/610,640

(22) PCT Filed: Apr. 15, 2019

(86) PCT No.: PCT/JP2019/016080
§ 371 (c)(1),
(2) Date: Nov. 4, 2019

(87) PCT Pub. No.: WO2019/203174
PCT Pub. Date: Oct. 24, 2019

(65) Prior Publication Data
US 2021/0023737 A1  Jan. 28, 2021

(30) Foreign Application Priority Data
Apr. 15, 2018  (JP) .............................. JP2018-078053

(51) Int. Cl.
*B27M 1/00* (2006.01)
*B27M 3/00* (2006.01)
*B32B 21/04* (2006.01)

(52) U.S. Cl.
CPC .............. *B27M 1/003* (2013.01); *B27M 3/00* (2013.01); *B32B 21/042* (2013.01); *B32B 2317/16* (2013.01)

(58) Field of Classification Search
CPC . B27M 1/003; B24B 7/12; B24B 7/19; B24B 7/28; B24B 29/005; B24B 19/24
See application file for complete search history.

(56) References Cited

U.S. PATENT DOCUMENTS 1,610,374 A * 12/1926 Hermans ................... B24B 7/24
15/4
2,075,925 A * 4/1937 Arthur ................... B27M 1/003
144/115
(Continued)

FOREIGN PATENT DOCUMENTS

CN         103347637 A     10/2013
EP           3011841 A1     4/2016
(Continued)

OTHER PUBLICATIONS

International Search Report for International Application No. PCT/JP2019/016080; dated Jul. 9, 2019.
(Continued)

*Primary Examiner* — Matthew Katcoff
(74) *Attorney, Agent, or Firm* — Cantor Colburn LLP

(57) ABSTRACT

[Problem] To address the problem of conventional old wood texture or antique taste boards which lack natural looking worn effects and present an appearance of an artificial treatment applied thereto. [Solution] Unlike a conventional configuration in which the rotary shaft of a roll brush is simply and fixedly arranged parallel to the wood grains of a board to which surface treatment is applied or the painted surface where paint is applied to the wood grains, the rotary shaft may be obliquely set to any angle including a right angle, and may be rotationally driven at high speed at a given inclined angle relative to the horizontal surface of the board along a left to right direction of the roll brush. This makes different "contact strength" of a roll brush such as a metal brush obliquely applied to each right and left end of the board, thereby causing the inclined roll brush to peel off the wood grains or the painted surface where paint is applied to the wood grains with difference strengths for each end of the board. This makes it possible to implement "uzukuri"

(Continued)

(brushing process) with different designs presented along a left to right direction of the board.

3 Claims, 9 Drawing Sheets

(56) References Cited

U.S. PATENT DOCUMENTS

| | | | | |
|---|---|---|---|---|
| 2,617,223 | A | * | 11/1952 | Davidson ................ B24B 7/28 29/76.1 |
| 3,081,159 | A | * | 3/1963 | Brown ..................... B24B 7/28 427/274 |
| 4,733,500 | A | | 3/1988 | David |
| 7,503,832 | B1 | * | 3/2009 | Chang .................... B24B 7/005 451/11 |
| 9,452,545 | B1 | * | 9/2016 | Yoder, Jr. ............... B27M 1/003 |
| 2015/0230482 | A1 | | 8/2015 | Kumisaka |

FOREIGN PATENT DOCUMENTS

| | | | |
|---|---|---|---|
| JP | S499299 | A | 1/1974 |
| JP | 5642846 | B1 | 9/1981 |
| JP | H0631613 | A | 2/1994 |
| JP | H06238619 | A | 8/1994 |
| JP | H09155281 | A | 6/1997 |
| JP | 2007175580 | A | 7/2007 |
| JP | 2008265215 | A | 11/2008 |
| JP | 2011005822 | A | 1/2011 |
| JP | 2012179613 | A | 9/2012 |
| JP | 2013091277 | A | 5/2013 |
| JP | 2013212695 | A | 10/2013 |
| JP | 2015023856 | A | 2/2015 |
| JP | 2015054518 | A | 3/2015 |
| JP | 2017189943 | A | 10/2017 |
| KR | 20130118972 | A | 10/2013 |
| WO | 201211 | A1 | 9/2012 |
| WO | 2014203423 | A1 | 12/2014 |

OTHER PUBLICATIONS

PCT International Preliminary Report on Patentability for International Application No. PCT/JP2019/016080; dated Oct. 20, 2020.
PCT Written Opinion of the International Searching Authority for International Application No. PCT/JP201 9/016080 dated Sep. 7, 2019.

* cited by examiner

BRUSHING MACHINE FOR PRODUCING VINTAGE-STYLE LUMBER, VINTAGE-STYLE LUMBER, AND METHOD FOR PRODUCING VINTAGE-STYLE LUMBER

CROSS REFERENCE TO RELATED APPLICATIONS

This application is the U.S. national stage of PCT/JP2019/016080, filed on Apr. 15, 2019, which claims priority under 35 U.S.C. § 119(a) and 35 U.S.C. § 365(b) to Japanese Patent Application No. 2018-078053, filed Apr. 15, 2018, the contents of which are incorporated herein by reference in their entirety.

TECHNICAL FIELD

The present invention relates to a brushing machine for manufacturing an old wood texture board that gives a feeling of long time use, an old wood texture board manufactured by the brushing machine, and a method of manufacture for the old wood texture board, particularly to a brushing machine for manufacturing an old wood texture board that gives a natural feeling of use by creating a variety of brushed patterns unlike a conventional design created by merely applying uniform brushing to the surface of the board.

BACKGROUND

A wide variety of design boards are commercially available, which are artistically painted to create an old wood texture or to give off an antique taste (feeling). Such artistically-painted design boards traditionally circulated in the market are subjected to surface treatment to produce an old wood taste or an antique feeling. However, a "natural looking worn effect" or a "distressed finish" actually derived from a long-term use is not successfully created on the board surface, and thus the board surface often fails to provide a real feeling of an old wood texture or an antique taste.

To address the problem, for example, Japanese Unexamined Patent Application Publication No. 1997-155281 discloses a "polishing and painting method" which allows anyone to easily make an antique taste painting to create a naturally worn feeling derived from a long-term use on the corner or the surface of furniture. The "polishing and painting method" includes steps of applying polishing powder to the surface of furniture after surface preparation, and wiping off the same with waste cloth before the polishing powder dries, thereby filling the wood grains of the furniture with the powder. After the above steps, the "polishing and painting method" is further implemented by applying color paint and finishing paint sequentially to the surface of furniture, then drying the paint.

However, the "polish painting method" needs to wipe off a fixed amount of paint with waste cloth to create an old wood texture, which causes the entire surface to look flat, thereby making it difficult to create a "natural looking worn effect" to give a sufficient vintage feeling. Further, "the polishing and painting method" needs manual work by an operator, thereby causing a problem that the method is hardly applicable to mass production.

Further, Japanese Unexamined Patent Application Publication No. 2007-175580 discloses a design application method that includes a step of applying design paint to an irregular wall surface and a step of scraping off the paint with a rubber trowel. However, scraping off the paint with a rubber trowel also causes a problem that a natural vintage feeing cannot be successfully created on the surface. Further, the design application method relates to the creation of design by a plasterer who creates a design using his or her professional skills and is not suitable for manufacturing boards according to the present invention, which are mass-produced and put into the lumber industry market.

Furthermore, Japanese Unexamined Patent Application Publication No. 2015-54518 discloses antique taste woods whose surface is processed to give off antique colors and shapes by applying incising process thereon; the antique taste woods are substitutes for wooden sleepers, which are processed to have the same design as wooden sleepers for the use in the garden. The antique taste wood is produced by applying brush grinding to at least one surface of a square lumber subjected to an incising process, thereby emphasizing the wood grains which stand out from the surface; the antique feeling is given off from the surface of the lumber by partially processing each surface with a scratch applied thereto and further painting each surface black or brown. Although this method is capable of creating a certain level of antique feeling by applying brush grinding to the surface before applying painting thereon, painting is applied uniformly to the entire surface, and thus fails to give off the natural feeling of use or a "natural looking worn effect". This eventually causes a problem that a feeling of antique lumber cannot be created sufficiently.

Furthermore, antique design USA-made wall panels (trade name is "stikwood"), which is shown in FIG. 5, are circulated in the recent lumber market. This is a relatively thin wall panel which emphasizes an early wood and a late wood with a stereoscopically finished surface and tries to create a naturally waste-wood like feeling by applying painting roughly to the stereoscopically finished surface with a paint roller. This panel looks similar to the wooden board according to the present invention at first glance in the aspect of creating a surface touch feeling of an antique texture. However, the painted surface simply created by applying paint to each of wood grain portions uniformly and roughly, is nothing more than a surface created by application of paint and therefore causes a problem of creating a texture different from the original texture of an old wood. Specifically, none of natural looking worn effects appear on the painted surface, thereby causing a problem that the painted surface looks like artificially created surface.

The wood processing technology called "Uzukuri" (brushing process) has been handed down for generations in Japan. This technology applies a process sufficient to create woodgrains which look clearer and adds a feeling of unevenness along the woodgrains, thereby creating a surface that gives old wood flavors or vintage effects. That is, a board having wood grains that appear on the surface is used as a wood material. The cross section of the board shows a pattern of wood grains which is made up of alternately appearing early woods and late woods. The early wood is a portion which grows in spring and summer of the year; this portion has a soft and low-density wood-grain texture because the growing speed is fast and normally presents a light color. Meanwhile, the late wood is a portion which grows in fall and winter of the year; this portion has a hard and high-density wood-grain texture because the growing speed is slow and normally presents a deeper color than the early wood. In the brushing process, for example, as shown in Japanese Unexamined Patent Application Publication No. 1994-238619, first, the surface of a wood material is polished by applying a sanding treatment or the like thereto, and then the polished surface is subjected to the brushing process. The brushing process is implemented using a brushing machine similar to a so-called planer in which the blade of a plane rotates. That is, in this brushing machine, the brushing process is implemented by putting a wood material that is a work piece in the brushing machine which is made up of a roll brush (such as a metal brush) instead of the plane blade of a planer. Specifically, when the surface of a wood material is polished or strongly brushed by a roll brush such as a metal brush, the surface of an early wood, which has a soft and low-density wood-grain texture, is significantly shaved to make a recess, whereas the surface of a late wood, which has a hard and high-density wood-grain texture, is hardly shaved thus remaining as a protrusion. This allows irregular effects to appear on the surface of the wood material, thereby implementing the brushing process.

According to this embodiment, a coloring agent is applied to the surface of a wood material after the surface of the wood material is subjected to a brushing process. A liquid material made by mixing dyes or pigments with a liquid binder is used as a coloring agent, which is applied to the surface of the wood material. The roll brush is then rotated reversely, with the wood material kept in contact therewith, to thereby scrape off the coloring agent from the surface of the wood material while the coloring agent is still wet, thereafter allowing the coloring agent to dry. In this situation, the process of scraping off the coloring agent allows a greater force to be exerted on the protruded surface of a late wood, so that a greater amount of the coloring agent is removed from the surface of the late wood to thereby leaving less coloring agent on the surface of the late wood. Whereas, the process of scraping off the coloring agent allows less force to be exerted on the recessed surface of an early wood, so that a smaller amount of the coloring agent is removed from the surface of the early wood thereby leaving more coloring agent on the surface of the early wood. Accordingly, the early wood is deeply colored by the coloring agent while the late wood is lightly colored by the remaining smaller amount of the coloring agent, so that the deepness of the color is reversed between the early wood and the late wood to thus provide clear contrast between them, thereby creating wood grains which look sufficiently clear. It is thus possible to create an old wood texture or antique taste surface of a wood material by implementing a brushing process using a brushing machine made up of a roll brush such as a metal brush instead of a plane blade. The similar technical method, in principle, for creating the surface of a wood material which exhibits the old wood texture or antique effects is also disclosed in Japanese Unexamined Patent Application Publication No. 1983-84709, Japanese Unexamined Patent Application Publication No. 2013-91277, and Japanese Unexamined Patent Application Publication No. 2017-189943.

However, a brushing process for creating an old wood texture or antique taste on a surface of a wood material using a conventional brushing machine made up of a roll brush such as a metal brush, is implemented with the rotary shaft of the roll brush arranged parallel to the surface of a wood material so that the roll brush is brought into uniform contact with the surface of the wood material, and as a result, the roll brush, which is uniformly in contact with the surface of the wood material, removes wood grains and coloring agents applied to the wood grains uniformly. Eventually, this makes the expression of a wood surface (design property) look uniformly "industrial" or "artificial", thereby resulting in a defect of "quality of uniformity" and "lack of variation". This lack of expression in design property is likely to become an obstacle to the creation of the old wood texture or antique effects on the surface of the wood material. As such, it has been long desired that a brushing machine is capable of giving a sufficient "natural looking worn effect" associated with long-term use on the surface of a board, thereby creating a distressed finish that gives the surface of a board the appearance of a real old wood texture or antique effects.

Further, Japanese Unexamined Patent Application Publication No. 2011-5822 discloses a surface treatment device and a surface treatment method that allow for the creation of wood grain patterns with a high quality of appearance. That is, one roller brush is made up of a plurality of annular brush bodies (14, 15, 16 in FIG. 4 of Patent Document 8) arranged side by side along a rotary shaft 17. The brush bodies rotate to apply wood grain patterns to the surface of a molded article. However, as shown in FIG. 2 of the Patent Document 8, the rotary shaft of the roller brush is arranged parallel to the surface of the molded article. As a result, the brushing process gives a monotonous design effect on a board.

Furthermore, a wire brush sanding machine for implementing a brushing process is disclosed in Japanese Unexamined Utility Model Application Publication No. 1981-42846, which is shown in FIG. 8, appended herewith as a Patent Document 9 which is most relevant to the present invention. This machine is characterized in that two wire brush rollers are obliquely attached so that the shaft center of one wire brush roller intersects with the feeding direction of a board that is a workpiece at an acute angle, while the shaft center of the other wire brush roller intersects with the feeding direction at a blunt angle. Because a cross-grain in a board may be directed normal or reversed with respect to the rotational direction of a single wire brush roller depending on the wood grains, two wire brush rollers are attached at mutually different angles as described above to allow a brushing process to be implemented suitably for any wood grains. However, according to this configuration, the angle of each wire brush roller is fixed relative to the feeding direction of the board and each wire brush roller is fixed to a position parallel to the horizontal surface of the board, and as a result, the brushing process also gives a monotonous design effect on a board.

RELATED ART DOCUMENTS

Patent Documents

Patent Document 1: Japanese Unexamined Patent Application Publication No. 1997-155281
Patent Document 2: Japanese Unexamined Patent Application Publication No. 2007-175580
Patent Document 3: Japanese Unexamined Patent Application Publication No. 2015-54518
Patent Document 4: Japanese Unexamined Patent Application Publication No. 1994-238619
Patent Document 5: Japanese Unexamined Patent Application Publication No. 1983-84709
Patent Document 6: Japanese Unexamined Patent Application Publication No. 2013-91277
Patent Document 7: Japanese Unexamined Patent Application Publication No. 2017-189943
Patent Document 8: Japanese Unexamined Patent Application Publication No. 2011-5822
Patent Document 9: Japanese Unexamined Utility Model Application Publication No. 1981-42846

SUMMARY

Technical Problems

The present invention addresses the problem of giving a painted surface a "natural looking worn effect" which cannot be seen in conventional boards with an appearance of artificial treatment. Particularly, it appears that the configuration of a brushing machine has a problem when the brushing machine is used to manufacture a board that exhibits an old wood texture or antique effects with a natural looking worn effect, which is applied thereto by scraping the painted surface of a board or by implementing a brushing process. That is, the rotary shaft of a roll brush such as a metal brush built in a conventional brushing machine is arranged simply parallel to the painted surfaces or the wood grains of a board that are to be subjected to surface treatment so that the brush comes in uniform contact with the entire surface of the board. This allows a peeling process or a brushing process to be applied uniformly to the entire surface of the board, thereby causing a problem of hardly creating a natural looking worn effect on the board.

Means for Solving Problem

Therefore, a brushing machine according to the present invention is configured to improve the arrangement of the rotary shaft of a roll brush such as a metal brush so that the rotary shaft is not arranged merely parallel to the painted surface or the wood grain of a board to be subjected to surface processing as in the related art, but the right and left rotary shafts are obliquely arranged so that the heights of the shafts relative to the surface of the board are mutually different (Embodiment 1), or the roll brushes are arranged at arbitrary angles relative to the conveyance direction of the board driven by a rotational conveyance roller (Embodiment 2). According to Embodiment 1, it is possible to vary a "contact strength" of the roll brush applied to the board between the right side and the left side of a board. Further according to Embodiment 2, it is possible to reduce the contact strength of the roll brush at a site immediately after the needles (not shown) of the roll brush go over a late wood while being rotationally in contact with the board, that is called a "rear of late wood," and to increase the contact strength of the roll brush at a site immediately before the needles of the roll brush go over a late wood while being rotationally in contact with the board, that is called a "front of late wood." As such, the inclined roll brush makes it possible to apply brushing to the right and left of the painted surface, or the right and left of the late wood in the board, with different contact strengths. In other words, a painted surface may be subjected to a peeling process with different contact strengths and a solid wood grain may be subjected to a brushing process with contrast added. This makes it possible to apply different peeling processes from a design viewpoint in a left to right direction of a board. Unlike a conventional roll brush that implements uniform peeling process with a uniform "contact strength" to a board, this embodiment may create "natural looking worn effects" or a "distressed finish" rich in more natural variation, thereby allowing the production of an old wood texture or antique taste board that looks authentic.

According to the above configuration, the arrangement of a rotary shaft may be changed, for example, by manual operation using a circular handle and a screwing mechanism. That is, the arrangement of a rotary shaft is fixed for a production lot. And for next production lot, an operator may change the arrangement of a rotary shaft by manual operation to implement different peeling process from a design viewpoint. However in another embodiment, a given actuator, which is controlled by a computer program instead of the manual operation described above, may be adopted to automatically lift and incline the rotary shaft relative to the surface of the board. With this configuration, the distance between the roll brush and the board may be more flexibly changed, thereby allowing the creation of natural looking worn effects rich in variation of peeling strengths on the surface of the board. This allows the production of a board subjected to surface treatment for creating an old wood textile or antique taste that look authentic at a glance. Such program control can be easily achieved by those skilled in the art based on prior art and is thus not detailed here.

Effect of Invention

According to a conventional brushing machine as shown in FIG. 8, the brushing machine is configured such that a roll brush such as a metal brush is arranged parallel to the surface of, for example, a board that is a workpiece to allow the roll brush to come in uniform contact with the surface of the board. Whereas, unlike the related art, the brushing machine according to the present invention allows the right and left rotary shafts to be obliquely arranged so that the heights of the roll brush relative to the surface of the board are mutually different. The heights of the roll brush may be optionally changed. Further, the contact strength of the brush is different between the front and the rear of a late wood, and thus it is possible to add a variation to the peeling process for paint and the brushing process for an early wood. Thus, the roll brush and the surface of a board come into contact with each other obliquely, and the roll brush and the surface of a board come into contact with each other non-uniformly on the front and the rear of the late wood. This configuration makes it possible to add various variations to the "contact" of a roll brush with the surface of a board. This makes it possible to create a more "natural-looking worn effect" on the surface of a board, thereby resulting in a benefit of allowing the production of a board with a genuine old-wood texture.

BEST MODES OF INVENTION

The purpose of the present invention is to brush a portion of a board with a roll brush, the board having a given painting applied thereto, then perform paint peeling and "uzukuri" (brushing process) partially, thereby facilitating the production of an antique texture board which looks old, calm, deep, and gives color contrast using a new wood material. The configuration of a brushing machine for achieving this purpose is discussed in more detail below.

Figure 1:
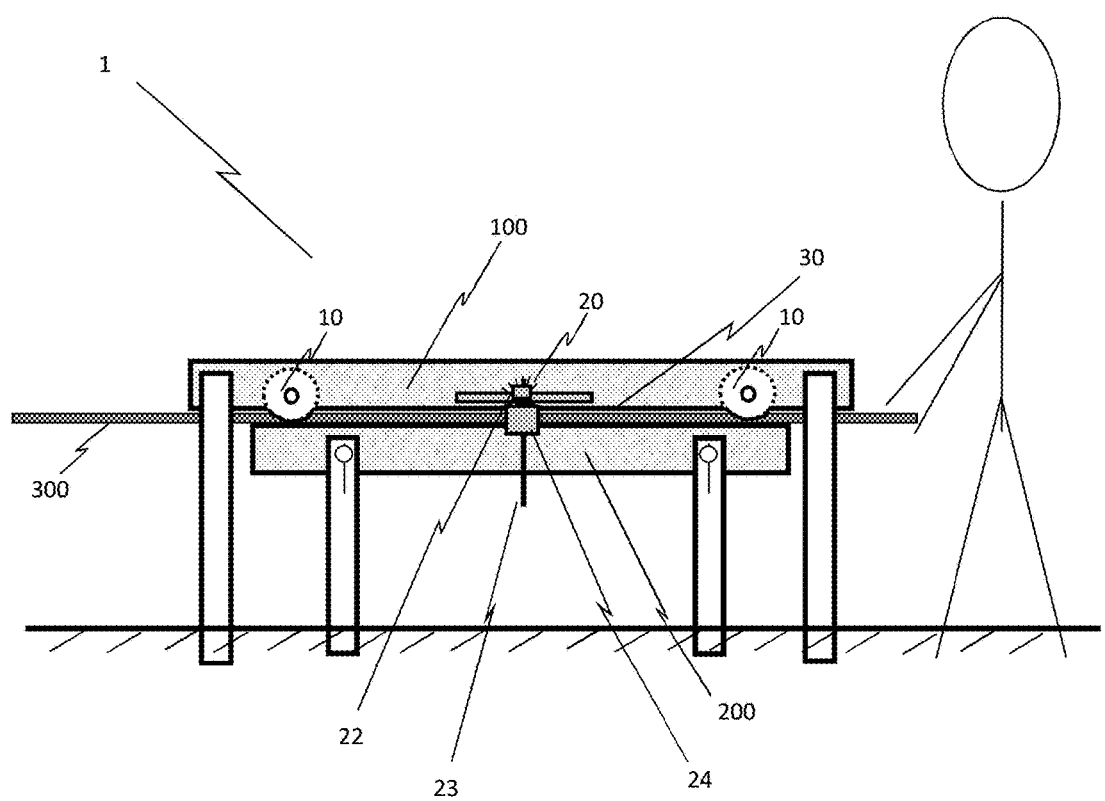
FIG. 1 is a conceptual diagram illustrating a brushing machine according to the present invention.

FIG. 1 is a conceptual diagram illustrating a brushing machine 1 according to the present invention. The basic configuration of the brushing machine is similar to a so-called planer according to prior art. That is, the brushing machine includes an upper fixed housing 100, and a lower movable housing 200 that moves vertically relative to the upper fixed housing. The upper housing may be configured to move vertically relative to the lower housing. A board 300 to be machined is placed in a vertically-formed gap between the upper fixed housing 100 and the lower movable housing 200 with a conveyance roller 10 rotating, and capable of feeding the board 300 forward and backward. The configuration is the same as the configuration of an ordinary planer. The brushing machine is different from the ordinary planer in that a roll brush 20 is rotatably held by a bearing 22 for holding roll brush in place of the blade of the planer between the conveyance rollers 10, 10 provided along the moving direction of the board. The roll brush 20 can be rotated at high speed by a motor (not shown) or the like. The roll brush may be made of a metal brush or a nylon brush. The roll brush may be replaced depending on the purpose for brushing. The roll brush 20 that rotates at high-speed makes it possible to peel off a portion of paint by brushing the painted surface of a board to which surface painting is applied, and further to implement "uzukuri" (brushing process) partially to the board that is a base material by applying strong brushing to the surface of the board. In order to add a variation to this brushing, a brushing machine 1 according to the present invention is also different from the basic configuration of a conventional planer in that a roll brush shaft 21, that is a transverse shaft, is configured to allow the height of the shaft to be set obliquely such that the right and left ends of the shaft have mutually different heights from the board 300. The setting of the roll brush shaft 21 is implemented by applying attitude control to a vertical bar 23 for holding a roll brush shaft, which supports the bearing 22 for holding the roll brush in a vertical direction using an actuator 24 for controlling the roll brush shaft.

Figure 2A:
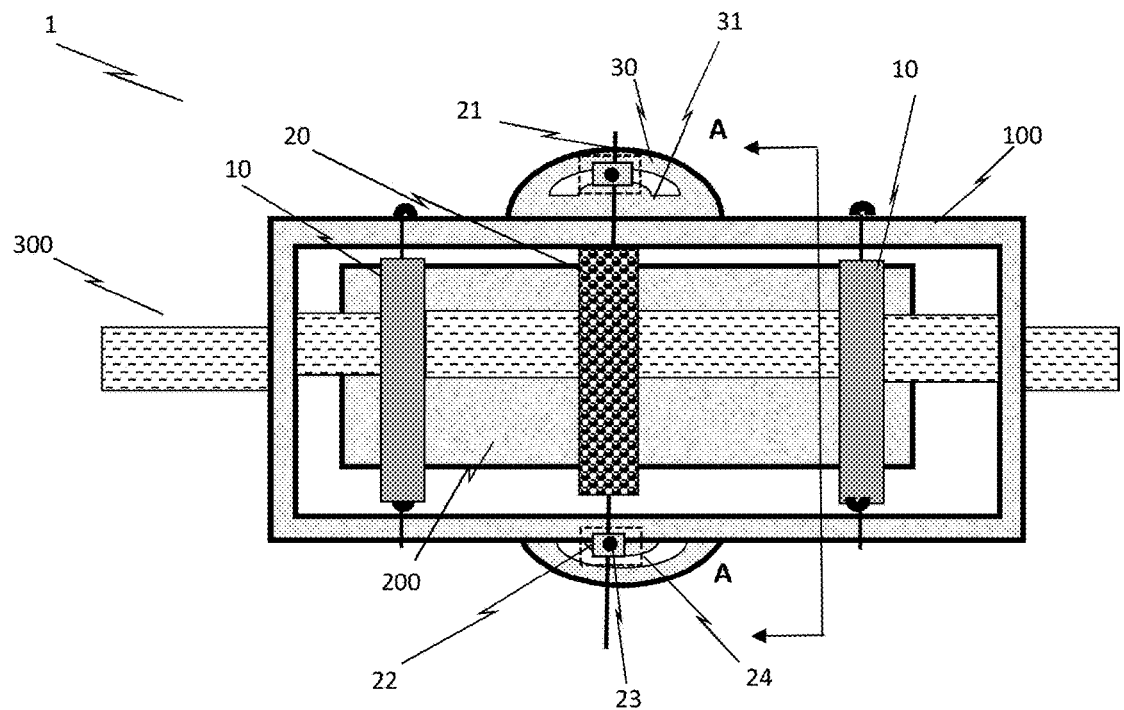
FIG. 2A, and FIG. 2B are conceptual diagrams illustrating angular setting of a roll brush in a brushing machine according to an embodiment 1.
Figure 2B:
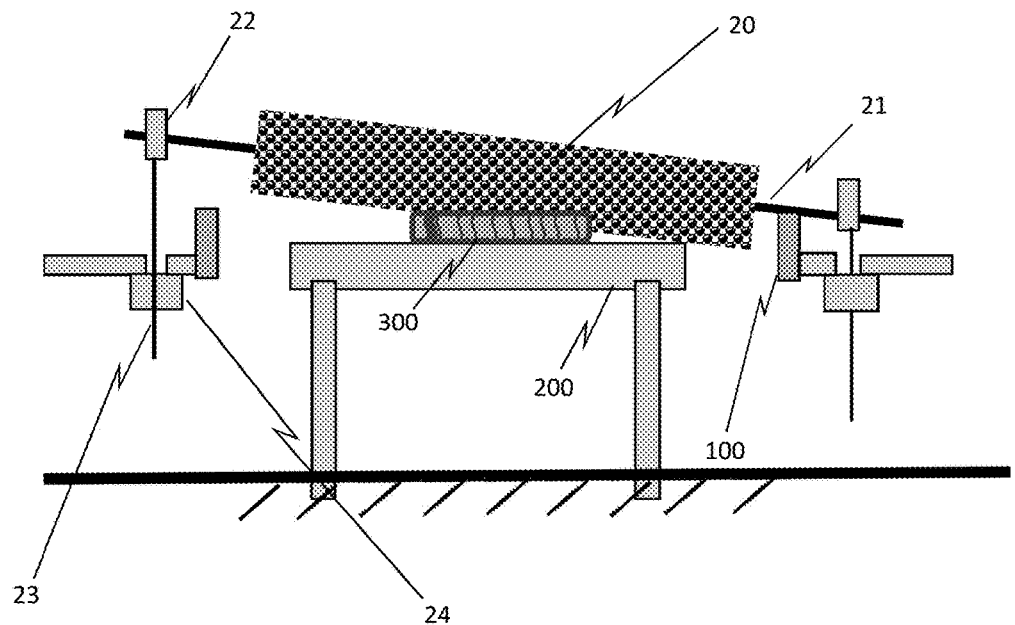

FIG. 2A, and FIG. 2B are conceptual diagrams illustrating angular setting of a roll brush 20 in a brushing machine 1 according to an embodiment 1. FIG. 2A is a plan view; and FIG. 2B is a cross-sectional view of the brushing machine 1 at the roll brush shaft 20 in FIG. 2A. Unlike a planer according to prior art, vertical bar guiding boards 30, 30 are projected symmetrically in a horizontal direction from the lateral surface of the upper fixed housing 100. Arcuate notched grooves 31, 31 are provided in the vertical bar guiding boards 30, 30. As shown in FIG. 2B, the roll brush shaft 21 is rotatably held by the bearings 22 for holding a roll brush. Further, the bearings 22 for holding a roll brush are vertically held by vertical bars 23, 23 for holding roll brush. The vertical bars 23, 23 for holding roll brush are inserted through the arcuate notched grooves 31, 31, and are subjected to attitude control by actuators 24, 24 for controlling a roll brush, which are mounted on the bottom surface of the vertical bar guiding boards 30, 30. That is, according to the present invention, the roll brush 20 is subjected to attitude control by the actuators 24, 24 for controlling the roll brush shaft such that the roll brush 20 is arranged perpendicular to the conveyance direction of the board 300, as shown in FIG. 2A, and is held at a given inclined angle relative to the horizontal surface of the board 300 in a left to right direction as shown in FIG. 2B. As such, the roll brush 20 is not brought into parallel contact with the board 300, instead, only a portion of the board 300 (in this case, the right half portion of the board 300) is subjected to oblique brushing. A specific process for performing attitude control for the roll brush 20 using the actuators 24, 24 for controlling roll brush is not detailed here because it is not the main focus of the present invention, but any process for performing attitude control may be applicable. For example, the inclined angle of the roll brush 20 relative to the horizontal surface of the board 300 in a left to right direction may be adjusted by rotationally engaging a screw thread provided around the vertical bars 23, 23 for holding roll brush with a rotary nut (not shown) of the actuators 24, 24 for controlling the roll brush. Further, the inclined angle of the roll brush 20 relative to the conveyance direction (right angle in this example), may be controlled by rotationally engaging a gear (not shown) of the actuators 24, 24 for controlling the roll brush with recesses provided along the inner perimeter of the vertical bar guiding boards 30, 30. These controls may be performed manually by an operator of the brushing machine or may be performed by executing the program in a CPU (not shown). These controls are not detailed herein because all of such controls may be performed by using prior art.

Figure 3A:
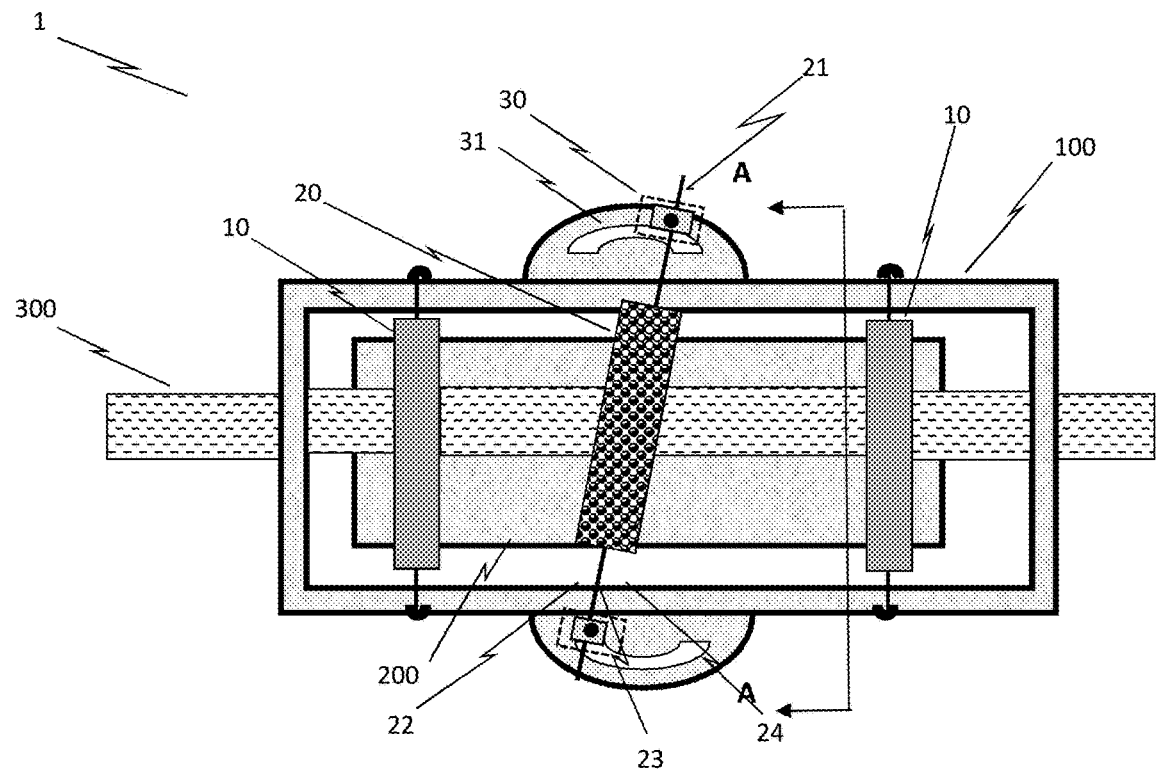
FIG. 3A, and FIG. 3B are conceptual diagrams illustrating angular setting of a roll brush in a brushing machine according to an embodiment 2.
Figure 3B:
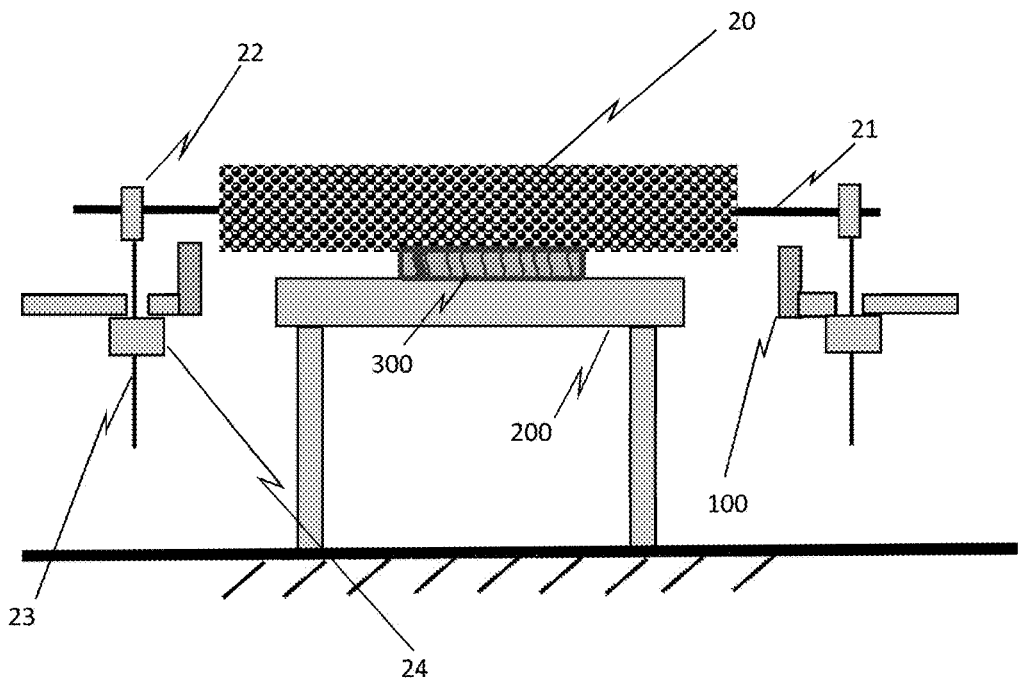
Figure 8:
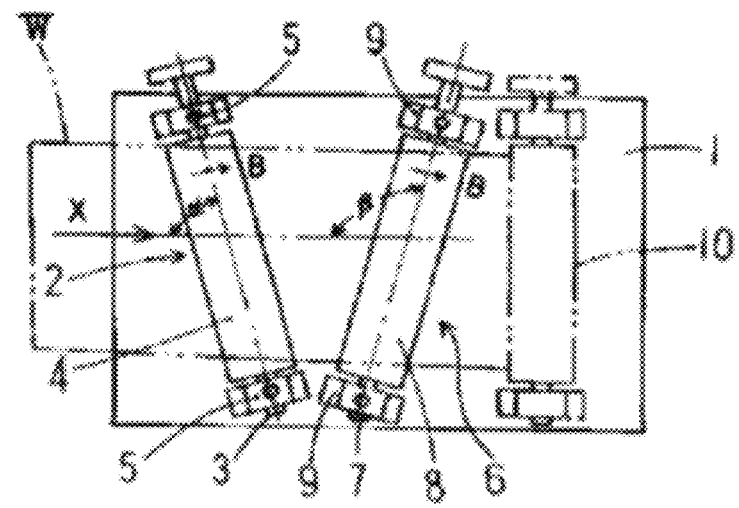
FIG. 8 illustrate reference drawings of a wire brush sanding machine for implementing a brushing process disclosed in Japanese Unexamined Utility Model Application Publication No. 1981-42846 which is most relevant to the present invention.
Figure 8:
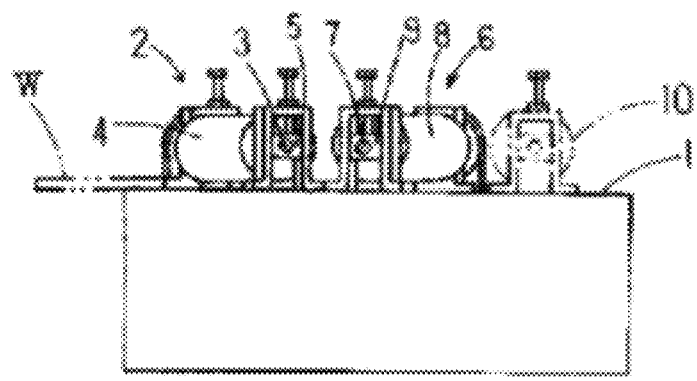
Figure 8:
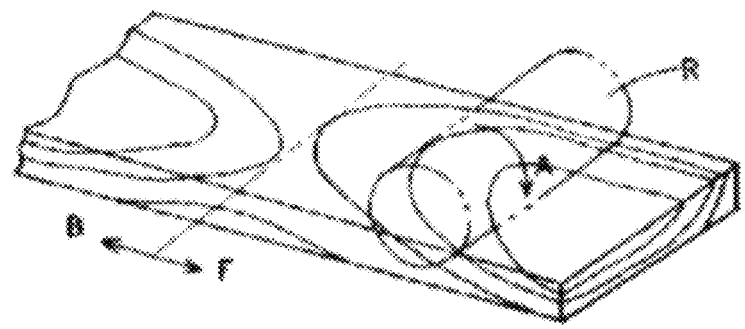

FIG. 3A and FIG. 3B are conceptual diagrams illustrating a brushing machine 1 according to an embodiment 2 of the present invention. According to the embodiment 1 described above, the inclined angle of the roll brush 20 is set to a right angle relative to the conveyance direction and is obliquely set to a given angle along a left to right direction, whereas, according to the embodiment 2, the roll brush 20 is set to a given inclined angle relative to the conveyance direction as shown in FIG. 3A, and is kept horizontal along a left to right direction as shown in FIG. 3B. A given inclined angle relative to the conveyance direction of the brushing machine 1 is adjusted by sliding and moving the vertical bar 23 for holding the roll brush along the arcuate notched groove 31 using the actuator 24 for controlling the roll brush. In this respect, the configuration of this embodiment is different from the configuration in the above-described Patent Document 9 (as shown in FIG. 8) in which the set angle of each wire brush roller is fixed relative to the conveyance direction of a board.

Figure 4A:
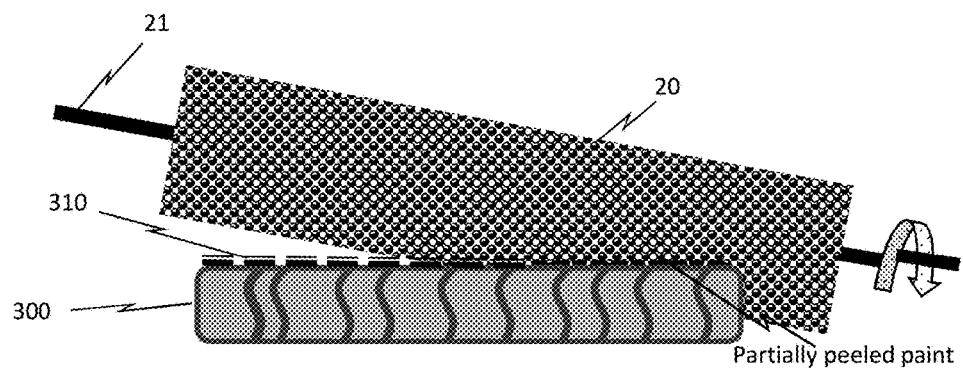
FIG. 4A, FIG. 4B, and FIG. 4C are conceptual diagrams illustrating an oblique contact portion between a roll brush and a board when the height of a roll brush shaft according to the embodiment 1 is set such that the heights of the right and left ends of the roll brush shaft are different from each other.
Figure 4B:
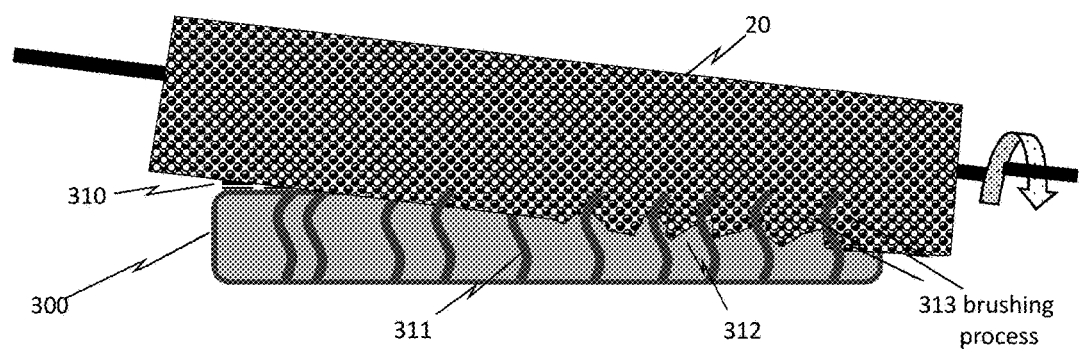
Figure 4C:
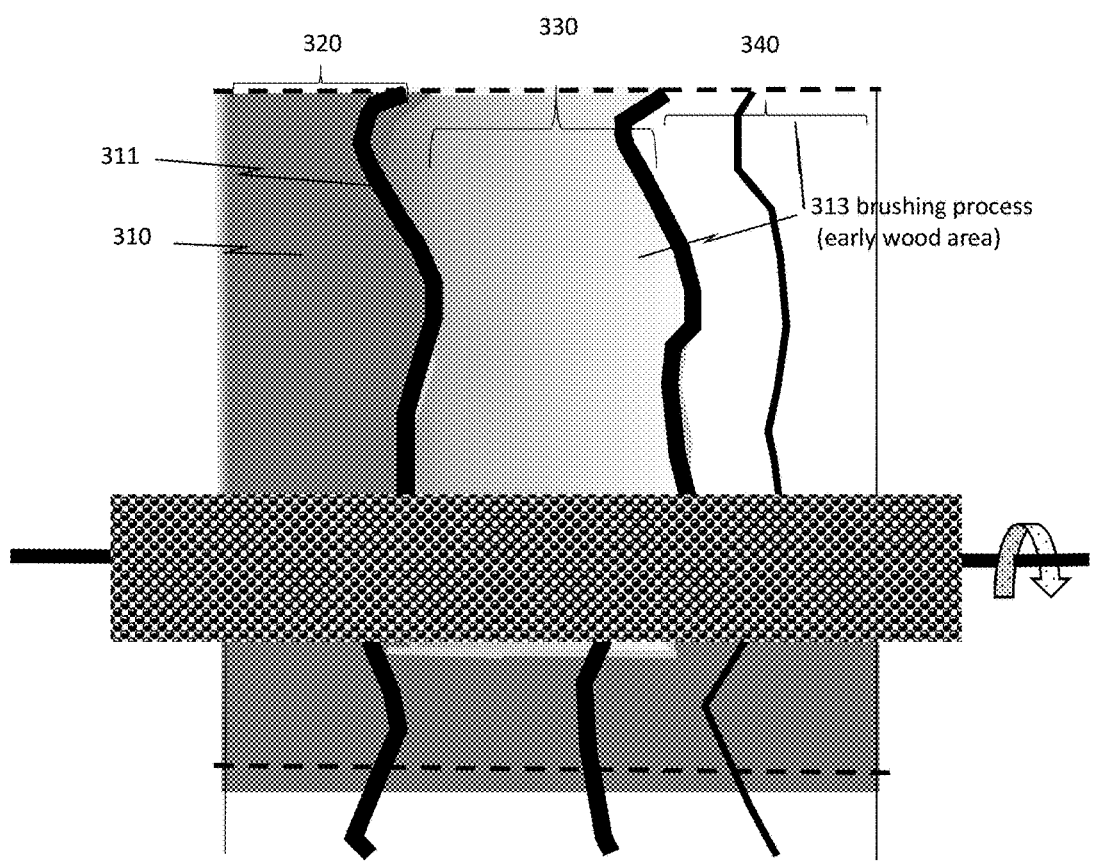

Next, how the roll brush 20 according to the above-described embodiments 1, 2 acts on the board 300 as a workpiece is described. FIG. 4A, FIG. 4B, and FIG. 4C are conceptual diagrams illustrating an oblique contact portion between the roll brush 20 and the board when the height of the roll brush shaft according to the embodiment 1 is obliquely set such that the heights of the right and left ends of the roll brush shaft are different from each other. A given paint 310 is preliminarily applied to the surface of the board 300. The paint layer may be made of a single layer or may be made of a plurality of layers to create complex vintage effects. In this case, as shown in FIG. 4A, the roll brush 20 is obliquely set to a given inclined angle and obliquely comes into contact with the board 300 conveyed forward by the conveyance roller 10. Unlike the conventional brushing machine, the roll brush 20 of the brushing machine 1 applies oblique brushing to only the right side of the board 300. This allows the roll brush 20 to come into oblique contact with only the right-side paint surface for brushing. The amount of the paint 310 to be peeled off is determined by adjusting the conveyance speed of the board 300 and the oblique contact strength of the roll brush 20 applied to the board 300. The conveyance speed and oblique contact strength may be set by manual operation or may be set in accordance with a program executed by a CPU. The roll brush 20A peels off a given amount of the paint 310 to thus create "more natural looking worn effect", thereby making it possible to produce a natural feeling and antique taste board.

Further, as shown in FIG. 4B, when the roll brush 20 is set to apply brushing to the board 300 with a larger contact strength for longer time, the paint completely peels off on the right-side portion of the board 300, and thus "uzukuri" 313 (brushing process) is applied to the base material under the paint. In this case, an early wood that is a relatively soft wood material of the board 300 is more easily subjected to brushing process by the roll brush 20. As a result, the brush 20 may form a variety of board surfaces as shown in FIG. 4C, namely the board surfaces including: a painted surface 320 remaining as it is, on the left side of the board 300; a partially peeled-off surface 330 created by obliquely rotating brush, at the center of the board 300 exhibiting gradation extending in a left to right direction with the paint continuously and randomly peeled off; and a "uzukuri surface" (a brushed finish surface 340) created by obliquely rotating brush, on the right side of the board 300 where the entire paint is peeled off with the brushing process applied thereto. In this respect, it should be taken into consideration that although the partially peeled-off surface 330 created by the obliquely rotating brush should be depicted in such a manner that gradation extending in a left to right direction with the paint continuously and randomly peeled off as described above, such gradation fails to sufficiently come out in the conversion process to a PDF file with this PCT electronic filing system, thereby resulting in an entirely whiteout display as shown in FIG. 4C. However, in the original specification, the obliquely peeled-off surface 330 created by the obliquely rotating brush is arranged side by side with the painted surface 320 having the deep-colored remaining paint 310 and located on the left side, and with the brushed finish surface 340 created by the obliquely rotating brush on the right side of the partially peeled-off surface 330 where the entire paint is peeled off with the brushing process applied thereon. As a result, this embodiment creates a surface design exhibiting gradation with the paint 310 sequentially losing the deepness of its color while changing its expression from left to right of the board 300.

Figure 5:
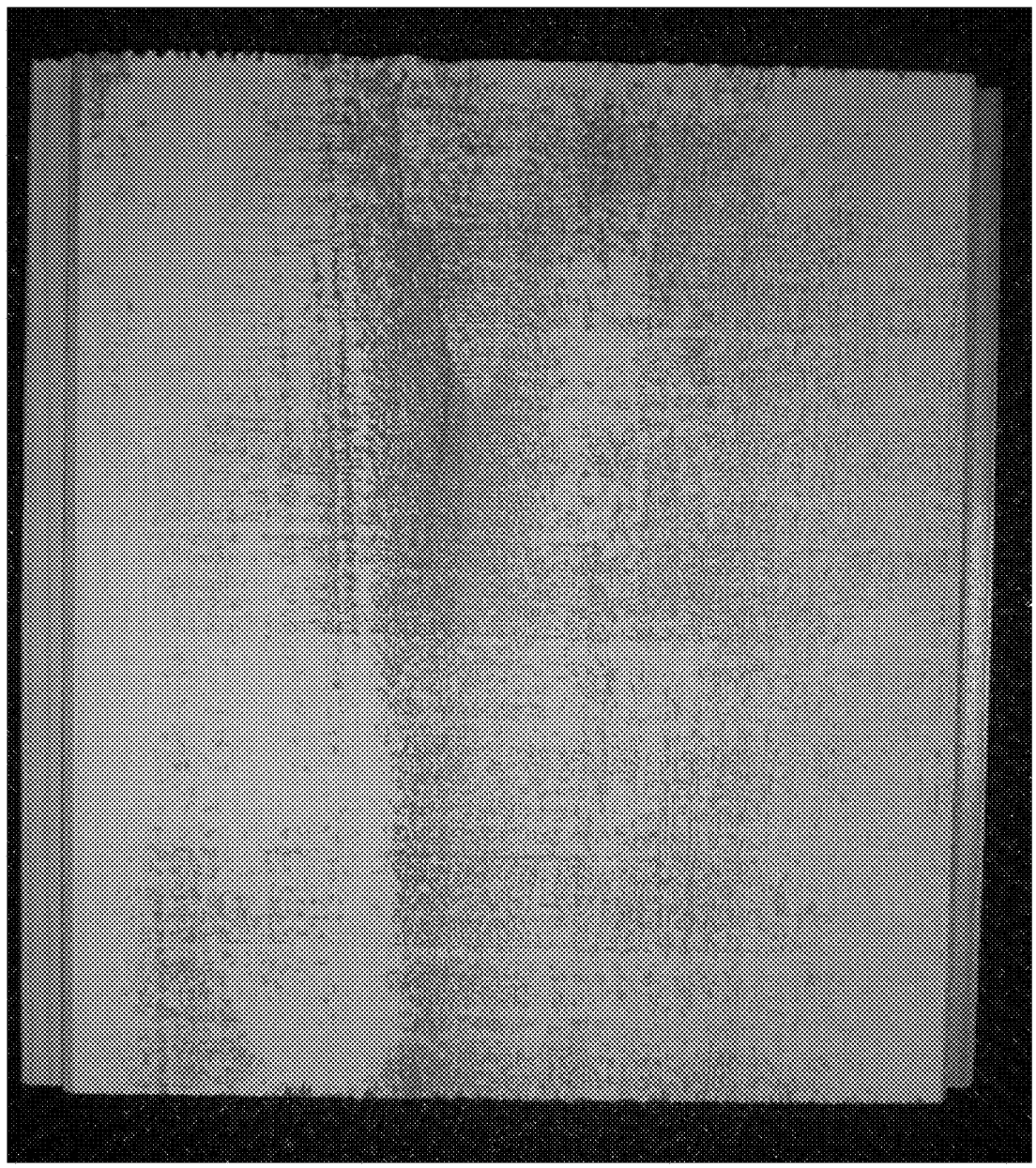
FIG. 5 is a surface photograph of a board manufactured according to the embodiment 1.

The rotating motion of the linear roll brush 20 forms both the obliquely peeled-off surface 330 created by obliquely rotating brush and the brushed finish surface 340 created by obliquely rotating brush as shown in FIG. 4A, FIG. 4B, FIG. 4C, thereby creating the same inclined angle along the transverse direction. In this way, "natural looking worn effect" and "long-term use feeling" are deepened to facilitate the production of the board 300 which has natural antique effects and old-wood texture. FIG. 5 is a photograph showing a sample of a board manufactured by applying to the actual board 300 a process of obliquely peeling off the paint from the board using the roll brush 20. In this sample, some white paint still remains on the left while some other paint is peeled off on the right, thereby making the board look to have a "worn effect" and naturally old. In this photograph, a so-called sawtooth runs transversely in addition to wood grains running vertically, thereby creating more complex "natural looking worn effects."

Figure 6A:
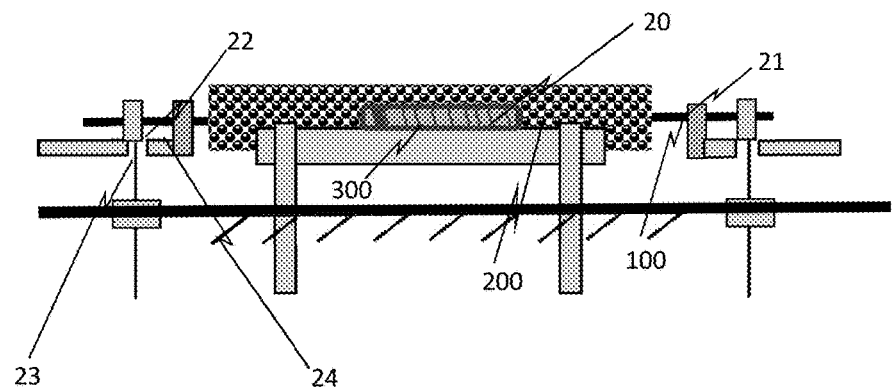
FIG. 6A, FIG. 6B, and FIG. 6C are conceptual diagrams illustrating a parallel contact portion between a roll brush and a board when the roll brush shaft according to the embodiment 2 is set parallel to the board and obliquely relative to the conveying direction of the board.
Figure 6B:
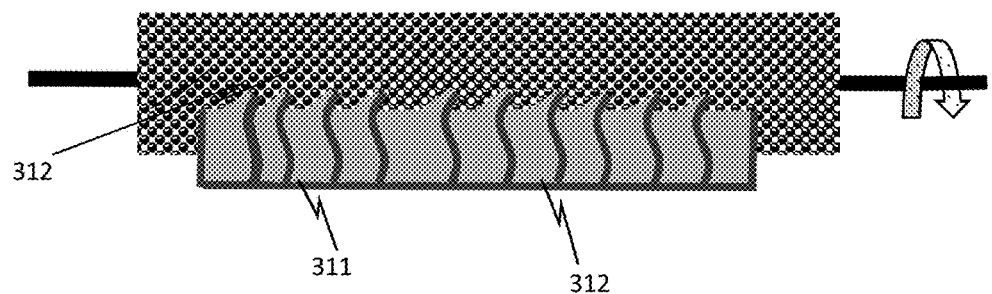
Figure 6C:
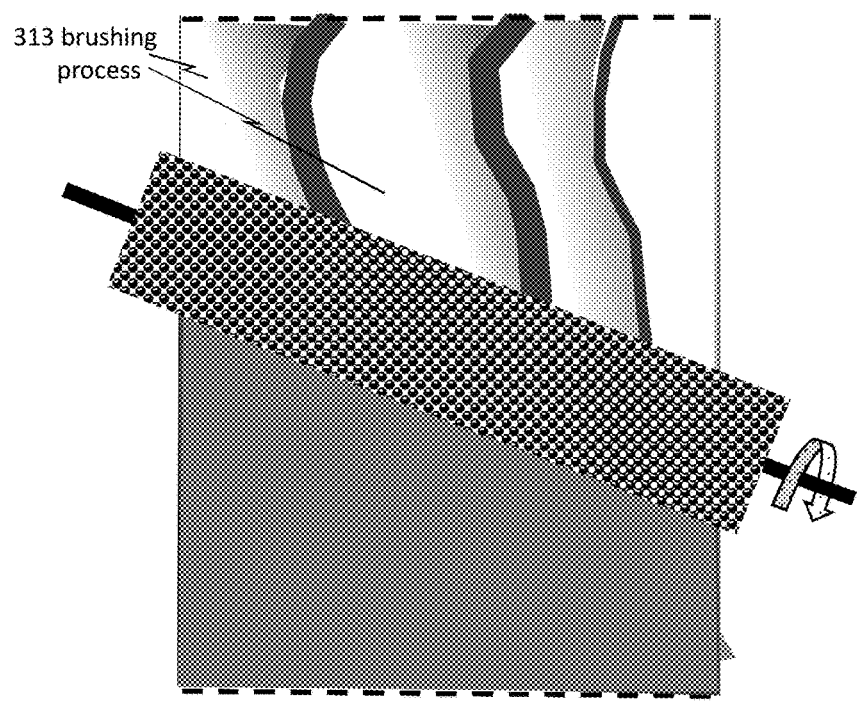
Figure 7:
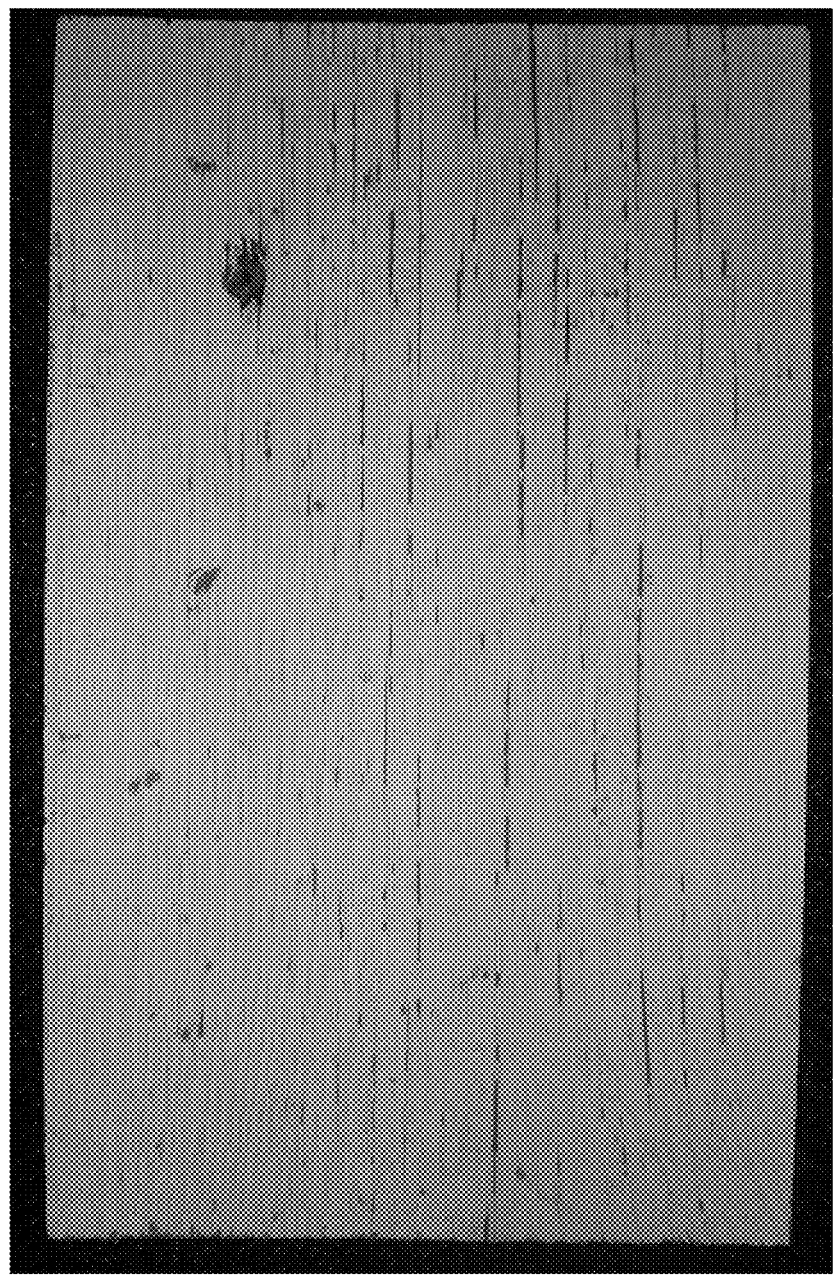
FIG. 7 illustrates an example of a board with antique effects to which a painting process according to the related art is applied.

FIG. 6A, FIG. 6B, and FIG. 6C are conceptual diagrams illustrating how the roll brush 20 according to the embodiment 2 described above acts on the board 300 as a workpiece. In this embodiment 2, the roll brush 20 is set with a given inclined angle relative to the conveyance direction as shown in FIG. 6C; and is set to have a horizontal attitude along left to right direction as shown in FIG. 6B. The wood grain of the board 300 according to this FIG. mainly runs vertically, so that the roll brush weakly comes into contact with "rear of late wood" 314, that is, the left side of each late wood immediately after the needles (not shown) of the roll brush go over a late wood in accordance with the rotational direction of the roll brush 20 that rotate clockwise at high speed. Whereas, the roll brush strongly comes into contact with "front of late wood" 315, that is, the right side of each late wood immediately before the needles (not shown) of the roll brush go over a late wood in accordance with the rotational direction of the roll brush 20. In this way, a paint peeled-off surface where only a part of the paint (310) is peeled off is created on the left side of each late wood, and a brushed finish surface created by completely peeling off the paint (310) while further applying brushing process thereto is created on the right side of each late wood. Further, a paint peeled-off surface and a brushed finish surface are created in an early wood 312 between a "rear of late wood" 314 and an adjacent "front of late wood" 315, and these surfaces continuously change to create gradation to thereby allow the production of a wood texture or an antique taste board (300) that has "natural looking worn effects" or a "distressed finish." It should be understood that the condition of remaining or peeling the paint or the contrast strength of a brushed finish surface may be arbitrarily changed by adjusting the inclined angle. Unlike these features, the configuration disclosed in Patent Document 9 fails to achieve a technical idea of arbitrarily changing the condition of remaining or peeling the paint or the contrast strength of brushed finish surface, because the arrangement angle of each wire brush roller relative to the conveyance direction of the board is fixed, and is thus fundamentally different from the configuration disclosed in the embodiment 2.

It goes without saying that the combination of the embodiments 1 and 2 that is a third embodiment capable of setting the inclined angle of the roll brush 20 relative to the surface of a board along a left to right direction and the inclined angle relative to the conveyance direction of the board makes it possible to create more sophisticated "natural looking worn effects."

INDUSTRIAL APPLICABILITY

The brushing machine 1 according to the present invention allows arbitrary setting of the inclined angle of the roll brush 20 relative to a left to right direction and the inclined angle of the roll brush 20 relative to the conveyance direction of a board, and therefore it is possible to create the partially peeled-off surface 330 created by obliquely rotating brush and the brushed finish surface 340 created by obliquely rotating brush in a left to right direction of the board 300 that is a workpiece, and further it is possible to remain an arbitrary amount of paint at the "rear late wood"

along the rotational direction of the roll brush or to implement the brushing process to an arbitrary level. Such brushing allows the creation of "natural looking worn effects", thereby facilitating the production of boards having natural old wood texture.

What is claimed is:

1. A brushing machine provided with a gap created between an upper housing and a lower housing, the gap arbitrarily adjustable depending on a thickness of a workpiece, the brushing machine including:
    a roll brush axially supported by the upper housing or the lower housing; and
    a conveyance roller axially supported by the upper housing or the lower housing,
    wherein the roll brush brushes a board that is the workpiece at a given contact pressure while the conveyance roller moves the board forward and backward through the gap,
    the roll brush is rotated at high speed while being maintained at a given inclined angle in a left to right direction of the roll brush relative to a horizontal surface of the board by actuators for controlling the roll brush so that the roll brush rotationally comes in contact with only one of either the right or the left of the board, and
    the roll brush peels off a paint at only one of either the right or the left of the board with which the roll brush rotationally comes in contact from the paint preliminarily applied to the entire surface of the board, or applies brushing process to only one of either the right or the left of the board, thereby producing an old wood textile or antique taste board with natural looking worn effects created on the board.

2. The brushing machine according to claim 1,
    wherein a roll brush shaft for the roll brush is rotatably held by bearings for holding roll brush; the bearings for holding roll brush are vertically held by vertical bars for holding roll brush; and the vertical bars for holding roll brush are subjected to attitude control vertically by the actuators.

3. A method for manufacturing an old wood texture board by brushing a board that is a workpiece with a roll brush while moving the board forward and backward by a conveyance roller,
    wherein the roll brush, which is maintained at a given inclined angle in a left to right direction relative to a horizontal surface of the board by actuators for controlling roll brush, is rotationally driven at high speed and brought into oblique contact with the board, to thus apply peeling process to only one of either the right or the left of the painted surface of the board or implements brushing process only one of either the right or the left of the base material of the board, thereby producing an old wood textile or antique taste board with "natural looking worn effects" created on the surface of the board.

\* \* \* \* \*